(12) United States Patent
Hebenstreit et al.

(10) Patent No.: US 9,205,868 B2
(45) Date of Patent: Dec. 8, 2015

(54) STEERING SPINDLE ARRANGEMENT

(75) Inventors: Axel Hebenstreit, Stuttgart (DE);
Hans-Dieter Loeffler, Reutlingen (DE);
Thorsten Meyer, Wildberg (DE)

(73) Assignee: Daimler AG, Stuttgart (DE)

( * ) Notice: Subject to any disclaimer, the term of this patent is extended or adjusted under 35 U.S.C. 154(b) by 61 days.

(21) Appl. No.: 14/237,232

(22) PCT Filed: Aug. 3, 2012

(86) PCT No.: PCT/EP2012/003319
§ 371 (c)(1),
(2), (4) Date: Mar. 25, 2014

(87) PCT Pub. No.: WO2013/020684
PCT Pub. Date: Feb. 14, 2013

(65) Prior Publication Data
US 2014/0246839 A1    Sep. 4, 2014

(30) Foreign Application Priority Data

Aug. 6, 2011 (DE) .......................... 10 2011 109 691

(51) Int. Cl.
| B62D 1/16 | (2006.01) |
|---|---|
| B62D 7/06 | (2006.01) |
| B62D 1/20 | (2006.01) |
| F16D 1/08 | (2006.01) |
| F16D 3/38 | (2006.01) |

(52) U.S. Cl.
CPC .. *B62D 7/06* (2013.01); *B62D 1/20* (2013.01); *F16D 1/0876* (2013.01); *F16D 1/0882* (2013.01); *F16D 1/0888* (2013.01); *F16D 3/387* (2013.01)

(58) Field of Classification Search
USPC .......... 280/779; 74/492, 493; 403/359.1, 373, 403/374.2
See application file for complete search history.

(56) References Cited

U.S. PATENT DOCUMENTS

| 4,067,247 A * | 1/1978 | Niemann et al. ................ 74/499 |
| 4,943,182 A | 7/1990 | Hoblingre |
| 7,198,425 B2 | 4/2007 | Bergkvist et al. |

(Continued)

FOREIGN PATENT DOCUMENTS

| DE | 689 03 350 T2 | 3/1993 |
| DE | 100 12 322 A1 | 9/2000 |

(Continued)

OTHER PUBLICATIONS

International Search Report (PCT/ISA/220 and PCT/ISA/210) with English translation dated Nov. 22, 2012 (6 pages).

(Continued)

*Primary Examiner* — Toan To
(74) *Attorney, Agent, or Firm* — Crowell & Moring LLP

(57) ABSTRACT

A steering spindle has a steering spindle connection connected to a fork crown of a steering coupling via an intermediate piece. The steering spindle connection and the intermediate piece are formed as plug partners at ends facing each other, by means of at least one tongue and groove guide element pair, which provides a torque-transmitting priority control. A groove and a tongue of the at least one tongue and groove guide element pair are positioned in the longitudinal axial direction on the steering spindle connection and the intermediate piece. The steering arrangement includes a clamping device that clamps the plug partners to each other in a plugging position.

10 Claims, 5 Drawing Sheets

(56) References Cited

U.S. PATENT DOCUMENTS

Figure 1:
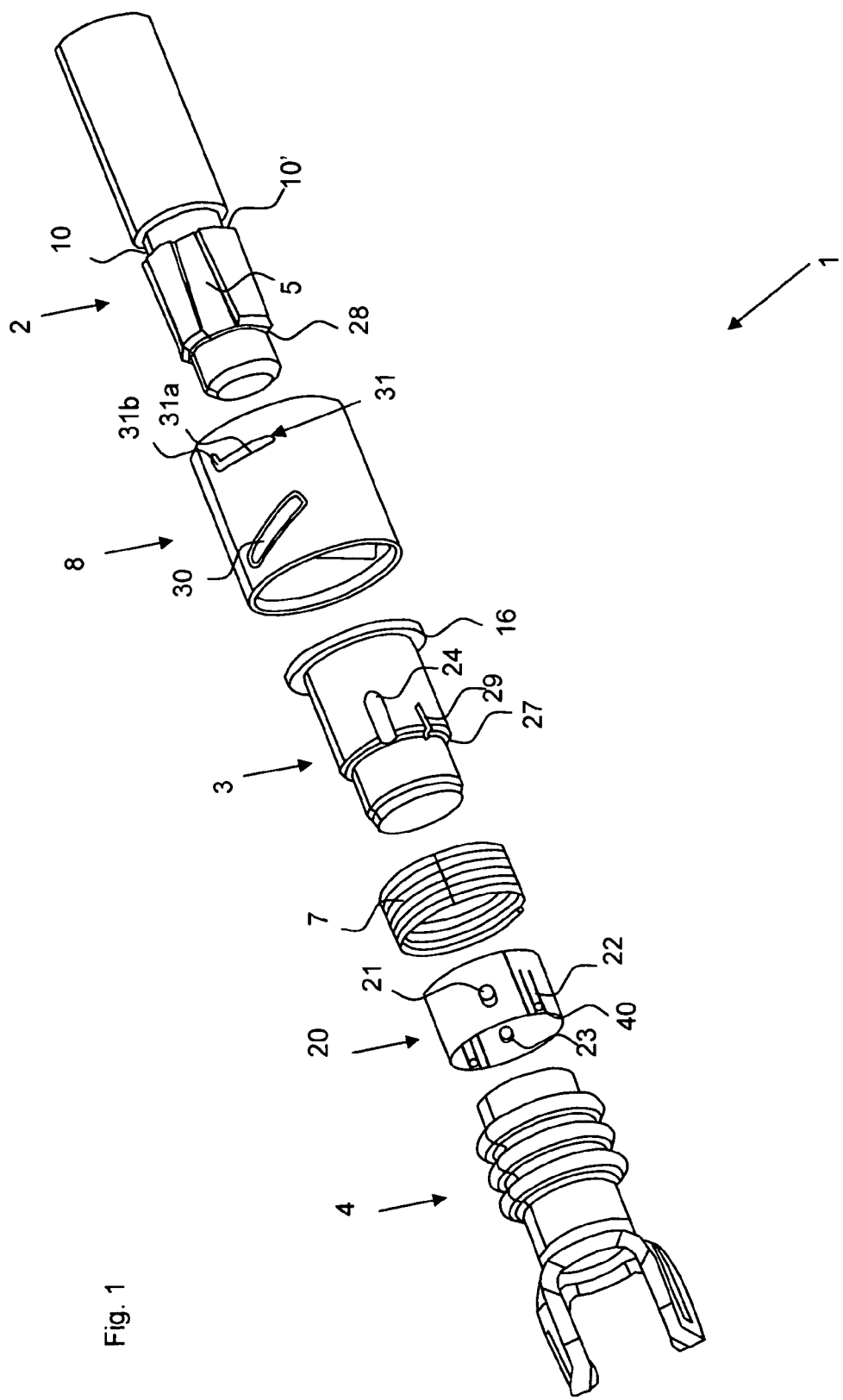

| | | |
|---|---|---|
| 7,481,459 B2 | 1/2009 | Lednicky et al. |
| 8,262,312 B2 | 9/2012 | Laisement et al. |
| 2005/0016315 A1* | 1/2005 | Breuss et al. .................... 74/493 |
| 2008/0178702 A1* | 7/2008 | Lutz ................................ 74/493 |
| 2009/0033082 A1* | 2/2009 | Klukowski .................... 280/777 |
| 2012/0024101 A1* | 2/2012 | Schnitzer et al. ............... 74/492 |
| 2013/0068553 A1* | 3/2013 | Klukowski et al. ............ 180/443 |
| 2014/0205375 A1* | 7/2014 | Hebenstreit et al. ........ 403/374.2 |
| 2014/0241795 A1* | 8/2014 | Hebenstreit et al. ........ 403/359.1 |

FOREIGN PATENT DOCUMENTS

| | | |
|---|---|---|
| DE | 10 2005 006 251 A1 | 8/2006 |
| DE | 602 15 911 T2 | 5/2007 |
| DE | 10 2008 006 497 A1 | 7/2009 |
| DE | 102 39 202 B4 | 2/2011 |
| JP | 10-205545 A | 8/1998 |
| WO | WO 2007/132133 A1 | 11/2007 |

OTHER PUBLICATIONS

German-language Written Opinion (PCT/ISA/237) dated Nov. 22, 2012 (6 pages).

German-language Search Report with partial English translation dated Jun. 14, 2012 (10 pages).

\* cited by examiner

STEERING SPINDLE ARRANGEMENT

BACKGROUND AND SUMMARY OF THE INVENTION

Exemplary embodiments of the invention relate to a steering spindle arrangement of a motor vehicle on the interface of the steering spindle with the steering coupling.

Currently direct screwing of the bottom of the steering spindle with the steering coupling is only possible in the combined field of exhaust gas assemblies, catalytic converters, engines and transmission lines with considerable effort. Here, the steering spindle is screwed in at the bottom with the steering coupling transverse to the steering spindle direction. On the one hand, this has the disadvantage of poor accessibility, and on the other hand the number of variants for optimizing the accessibility for different engine types and steering assemblies, for example left-hand and right-hand drive steering models, is increased, and, in addition, standard assembly sequences, such as the time of assembling the exhaust gas assembly, are hardly or not at all adhered to. In another approach regarding the configuration of the device, the steering coupling part is dispensed with and only the steering spindle at the bottom is used, wherein, however, a start-up of the engine in the Z direction during the final assembly, so the conflation of the pre-assembled engine/transmission and chassis unit, is, disadvantageously, not possible.

German patent document DE 10 2008 006 497 A1 describes an assembly arrangement for connecting a steering spindle to a steering coupling. The end piece of the steering spindle is inserted into an end receiving region of the steering coupling, wherein the assembly arrangement comprises a device for fundamentally achieving the coaxial alignment of the steering spindle and the steering coupling. Thus, the automatic conflation of the steering spindle with the steering coupling is enabled, since a manual, coaxial alignment of the steering spindle and the steering coupling can be avoided. To that end, the steering spindle has a hooking element at the end, into which a strap loop protruding from the end receiving region of the steering coupling is mounted before the final assembly. By pulling on the loop of the strap, the hooking element, together with the end piece of the steering spindle, is inserted into the end receiving region of the steering coupling so as to be screwed in there.

German patent document DE 10 2005 006 251 A1 addresses the problem of simplifying the assembly of a steering spindle on a motor vehicle. To that end, the steering spindle, which can be connected at one end to a steering wheel and at the other end to a steering gear via a steering coupling, has a cylinder body and a piston rod body inserted telescopically therein. The steering spindle has a pneumatic connection in communication with a cylinder chamber arranged in the cylinder body and axially delineated by the piston rod body, wherein the piston rod body is driven out from the cylinder body by an application of pressure on the cylinder chamber. Thus, the spindle end provided for the connection to the steering coupling does not have to be drawn into the engine bay by hand, but can rather be introduced into the engine bay by the application of pressure without it being necessary to touch said spindle end. Here, the steering spindle end and steering coupling are also screwed in transversely to the steering spindle direction.

German patent document DE 102 39 202 B4 discloses a connection between a steering shaft and a steering gear in a motor vehicle with a divisible joint, whereby the assembly and disassembly processes are simplified. To that end, the joint has an extension that can be fed, for assembly, through an opening in the footwell of the motor vehicle and which is equipped with protrusions, the joint being able to be inserted without rotation into a moveable cup-shaped or tulip-shaped receiver, which is located outside the footwell relative to the extension and which extends in the direction of the footwell. The joint is embodied as a tripod joint, wherein the extension has a tripod head with three segments extending radially away from the extensions, the segments engaging with corresponding grooves of the receiver.

Due to the tight construction space conditions, the steering train normally impedes the assembly of the engine module with the body. The provision of an intermediate piece, which connects the steering coupling to the end of the steering spindle, enables this to be able to be swivelled away in the loose state, i.e. unscrewed, at the interface at which it is screwed in with the end of the steering spindle, in order to simplify the assembly of the engine module. The steering spindle can be pushed back to some extent in the steering wheel direction. After the assembly of the engine, the intermediate piece must be reconnected to the end of the steering spindle. This is extremely difficult for the assembler, since the construction space for a manual operation hardly leaves any clearance and the connection partners are very difficult to detect optically.

Exemplary embodiments of the present invention are directed to simplifying the conflation of steering spindle end and steering coupling, as well as creating an arrangement that enables the conflated steering spindle and steering coupling ends to be connected to each other in the correct relative position and thus for a defective assembly to be prevented.

A first embodiment of the invention relates to a steering arrangement that has a steering spindle with a steering spindle connection, which is connected to a fork crown of a steering coupling via an intermediate piece, wherein the steering spindle connection and the intermediate piece are formed as plug partners on ends, which face each other, by means of at least one tongue and groove guide element pair that provides a torque-transmitting priority control. Each plug partner, steering spindle connection and intermediate piece thus has a groove or a corresponding tongue as the at least one guide element. The groove and tongue of the at least one tongue and groove guide element pair are positioned in the longitudinal axial direction on the steering spindle connection and the intermediate piece, wherein the steering arrangement comprises a clamping device that clamps the plug partners to each other in a plugging position.

Due to the guide elements according to the invention, which can be readily touched or optically perceived by an assembler, the steering spindle and the intermediate piece of the coupling may, in an advantageously simpler manner, be combined, wherein they always assume the correct relative position to each other due to the pre-determined guiding. The clamping device connects the plug partners by means of contact pressure force in such a way that undesired release of the plug partners during the vehicle operation is prevented. The guide elements formed by groove and tongue extend solely along the steering spindle axle. Therefore, a clamp-free manageability of the plug partners, which is easy for the assembler to embody, is enabled for achieving the plug connection.

The groove and tongue of the at least one tongue and groove guide element pair preferably have a tapered shape, wherein the groove tapers in the longitudinal axial direction towards the side facing away from the plug partner, and the tongue tapers in the longitudinal axial direction towards the side facing the plug partner.

In one embodiment, the groove(s) are provided on the steering spindle connection and the tongue(s) are provided on the intermediate piece. Thus, the at least one, preferably several, particularly preferably three grooves arranged with 120° displacement to one another are provided on the cylindrical exterior of the end of the steering spindle connection facing the intermediate piece, while one or more tongues are provided on the cylindrical interior of the intermediate piece. The number of grooves can thus be greater than the number of tongues, such that, for each tongue of the intermediate piece, at least one groove is present on the steering spindle connection. Naturally, it is generally also conceivable to provide the grooves in the intermediate piece and the tongues on the steering spindle connection, or to arrange both on both plug partners interchangeably.

Furthermore, the grooves on the steering spindle connection on its end facing away from the intermediate piece flow into a recess or an annular groove, the radial depth of which corresponds to or is greater than a groove depth.

The steering spindle connection and the intermediate piece preferably have tongue and groove guide element pairs designed with different widths and/or are distributed asymmetrically over the periphery of the steering spindle connection and the intermediate piece. A clear allocation of the tongue/groove guide elements of the plug partners is hereby possible, such that a defined relative position of the steering spindle connection and the intermediate piece with respect to each other is defined and no defective plug connection can take place during assembly. In the case of a symmetrical arrangement on the cylindrical exterior of the steering spindle connection and the interior of the intermediate piece, three respective grooves and tongues are, as mentioned above, arranged with 120° displacement to one another. The number of grooves can thus be greater than the number of tongues, such that, for each tongue of the intermediate piece, at least one groove is present on the steering spindle connection. Naturally, it is generally also conceivable to provide the grooves in the intermediate piece and the tongues on the steering spindle connection, or to arrange both on both plug partners interchangeably. With a plurality of grooves and tongues, the ability of the plug partners to transmit higher levels of torque is also improved.

A sleeve that can be moved relative to the intermediate piece is arranged around the intermediate piece, the sleeve having, on a steering spindle end side of the sleeve, one or more gearing segments extending radially inwards from the edge of the sleeve, which engage with the recess or annular groove in the plugging position, which recess or annular groove forms a stop with its coupling-side edge.

The clamping device, by means of which the plug partners can be clamped to each other in the plugging position, comprises a downwardly extruding annular collar of the intermediate piece, a helical spring arranged around the intermediate piece and a guide device, having at least one guiding pin, arranged for axial movement on the intermediate piece. The annular collar extends radially outwards on the steering-spindle-side end of the intermediate piece, wherein the helical spring arranged around the intermediate piece is supported at one end on the annular collar. At the other end, the helical spring is supported on the guiding pin.

The guide device can be a clamping sleeve, from which the guiding pin extends radially outwards, and which, furthermore, in a peripheral region, engages with a spring tongue that is penetrated by a locking pin and has a second guiding pin extending radially inwards, and which engages with a longitudinal groove that is introduced in the longitudinal axial direction in the exterior of the intermediate piece. The inner guiding pin, which runs in this longitudinal groove, ensures that the clamping sleeve is only moved axially. The guide device can alternatively have a ring or ring segment as an essential feature, which has holes at two diametrically opposite points that receive a bolt that forms the guiding pin.

Provision can furthermore be made for the intermediate piece to taper on the coupling-side end facing away from the annular collar in a stepped recess, which approximately corresponds to a ramp shape of the coupling-side end of the steering spindle connection. In a region of the intermediate piece that is close to the recess, a slot can, on the one hand, be formed in the section between the recess and the annular collar, through which the locking pin extends and, on the other hand, the longitudinal groove can also be arranged in the region of the intermediate piece in the section between the recess and the annular collar, wherein it preferably breaks through the annular collar, such that the arrangement of the clamping sleeve is simplified with the inwardly-pointing guiding pin.

The sleeve enclosing the intermediate piece, the guide device and the helical spring can furthermore have at least one slot forming a guide runner for the radially outwardly-extending guiding pin of the guide device. This slot can run helically.

In a further embodiment, the intermediate piece can comprise a control pin extending from a peripheral surface of the annular collar. To that end, the control pin can be arranged in a bore-hole in the peripheral surface. The control pin can then engage with a further slot in the sleeve, which is formed in the steering-spindle-side end region of the sleeve as a guide runner. This slot particularly has a first track section in the peripheral direction and a second track section running at right angles to the first track section in the axial direction with respect to the steering-spindle-side end of the sleeve.

Alternatively to the control pin and the runner thereof, the sleeve can have a cam on its interior behind each gearing segment, which is displaced radially backwards with respect to the gearing segment and which, in the plugging position in which the gearing segments engage behind the coupling-side edge of the recess/annular groove, engage with a depression in the annular collar. Furthermore, for each cam, a trough-like impression is formed on a front side of the intermediate piece as transportation security, with which the cam engages in a transportation arrangement of the steering arrangement. Thus, the components are protected from misuse by the transportation security apparatus up to the point of assembly.

In addition, the steering arrangement can, according to a further embodiment of the invention, have a further depression in the sleeve, adjacent to one of the gearing segments, the depression displaying a security ring contour or comprising an embedded retainer ring. A pin extending axially from the front side of the intermediate piece can be incorporated into this depression or into the retainer ring embedded in the depression, if the cam locks into the depressions of the annular collar. For this, the pin has a contour corresponding to the security ring contour of the depression or the retainer ring embedded therein. A secure connection of the plug partners, and thus the steering spindle, is guaranteed by this mechanical positive fit, even if the pre-stressing elements fail.

Defective assemblies are advantageously prevented by the plug connection according to the invention; furthermore, clearance caused by wear can be compensated for up to a certain degree.

BRIEF DESCRIPTION OF THE DRAWING FIGURES

These and other advantages are demonstrated by the description below with reference to the accompanying figures. The reference to the figures in the description serves to support the description and to facilitate understanding of the subject matter. Subject matters or parts of subject matters that are essentially the same or similar can have the same reference numerals added to them. The figures are only a schematic depiction of an embodiment of the invention.

Figure 2:
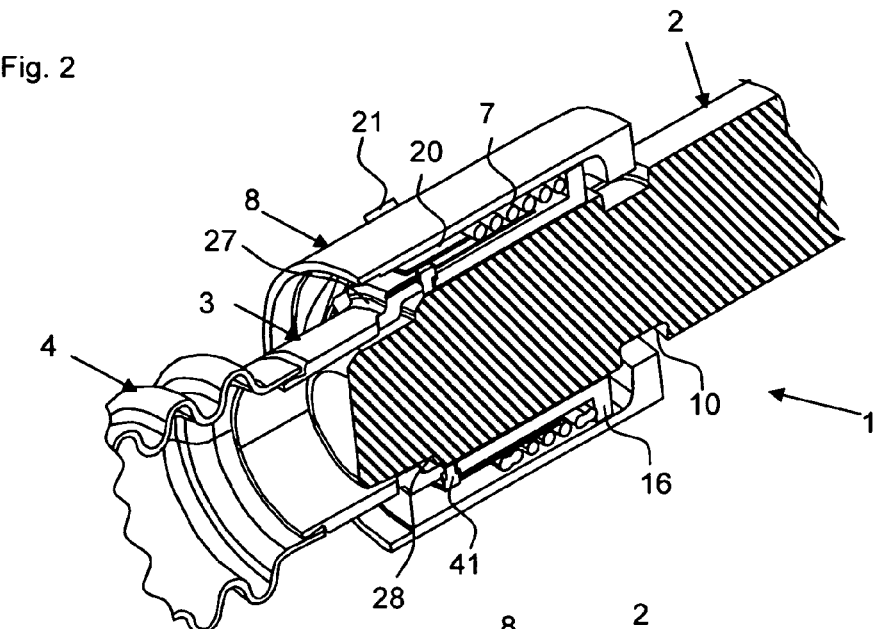
Figure 3:
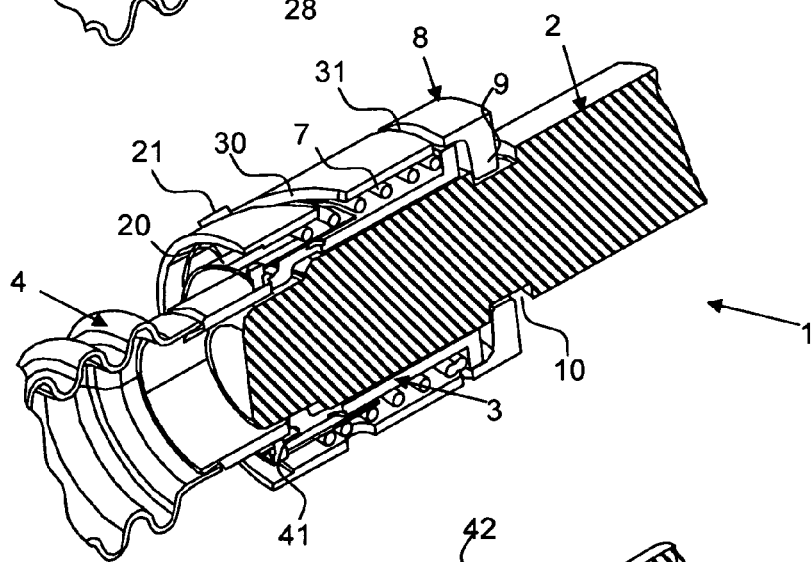
Figure 4:
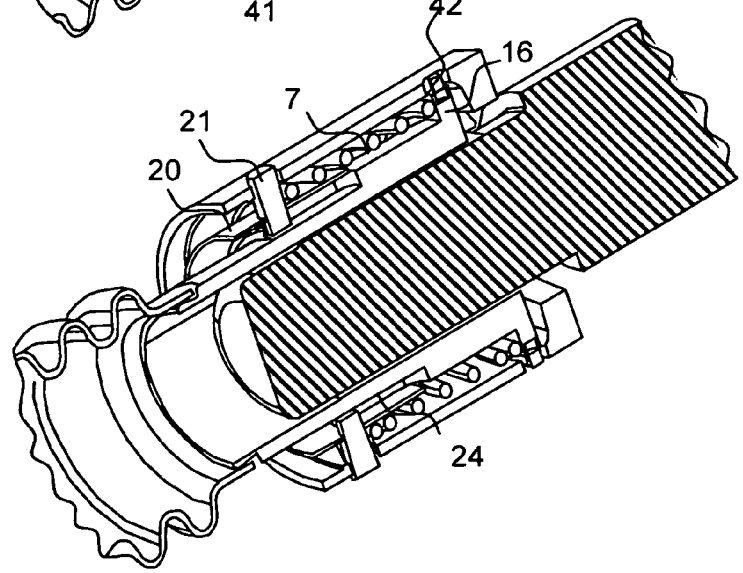
Figure 5:
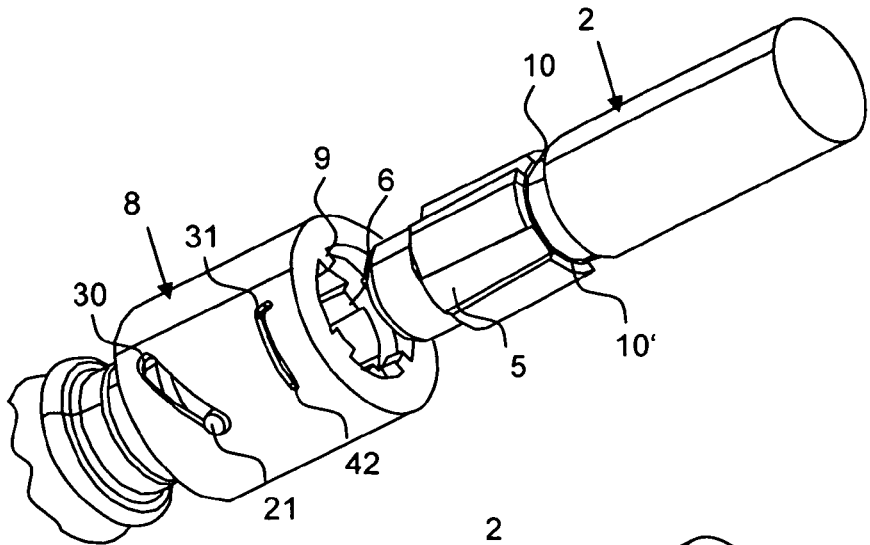
Figure 6:
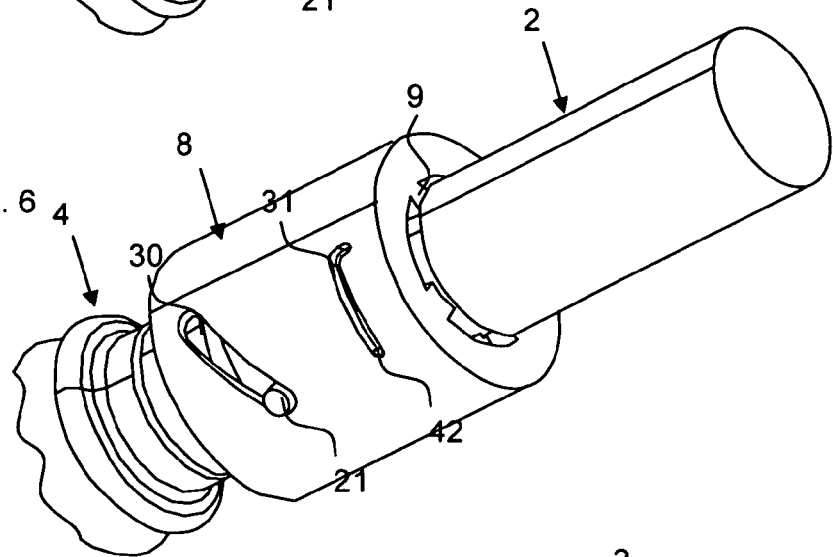
Figure 7:
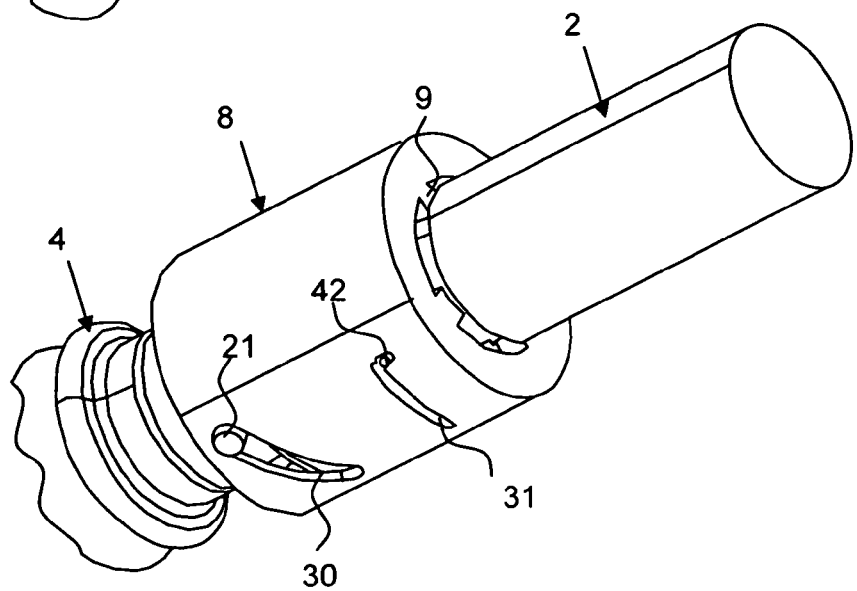
Figure 8:
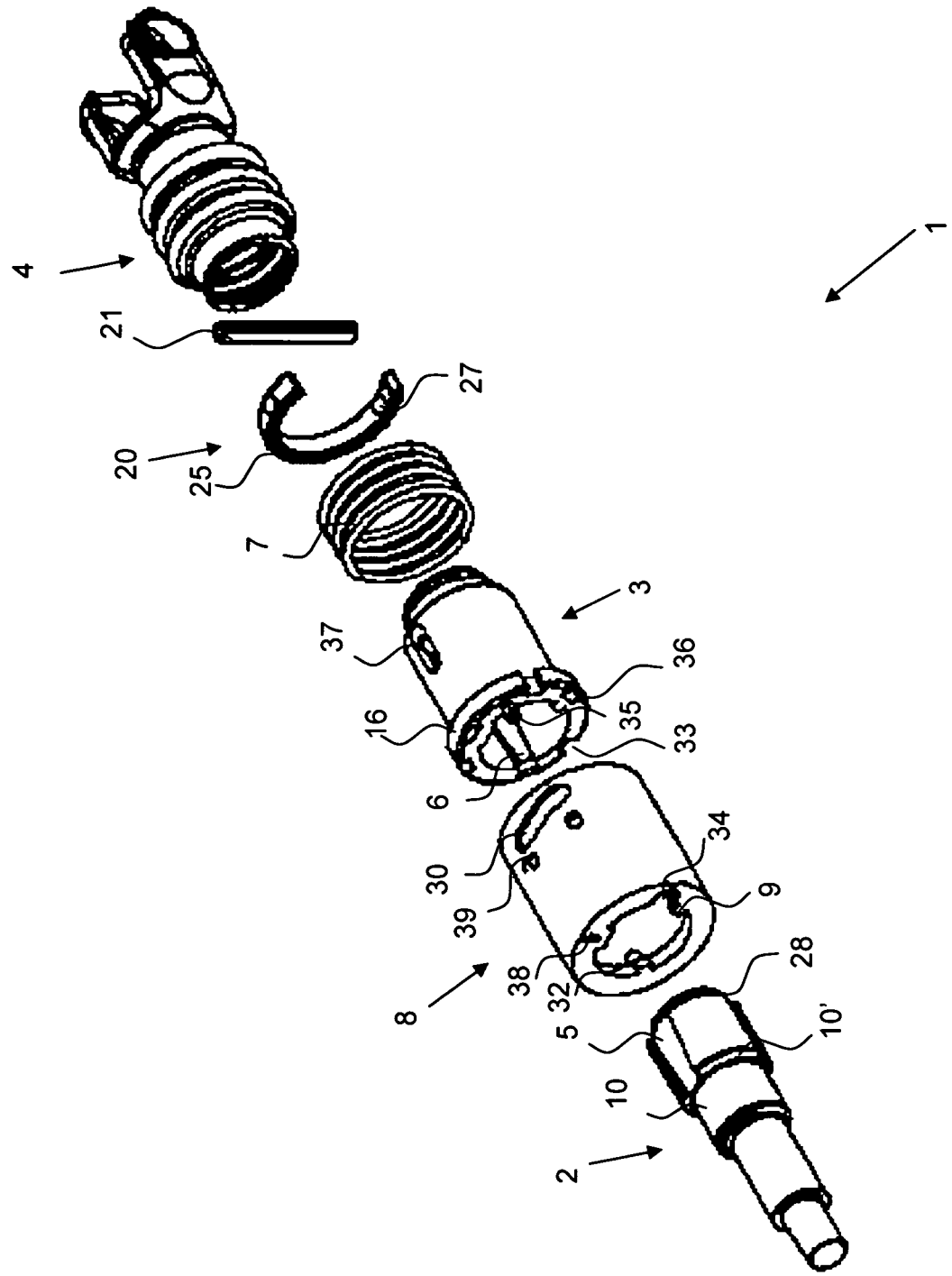
Figure 9:
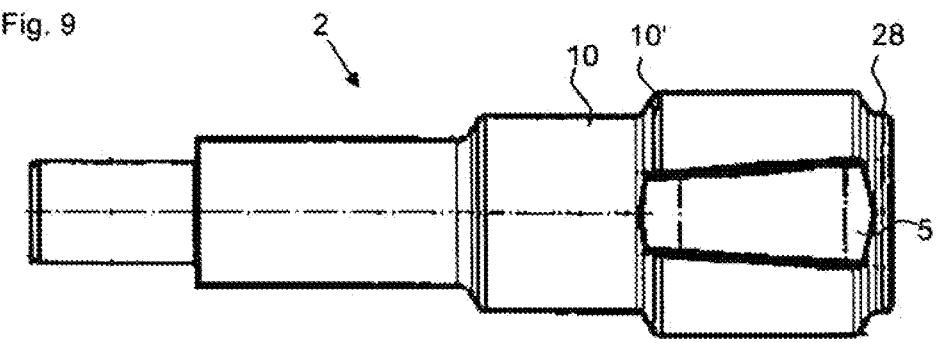
Figure 10:
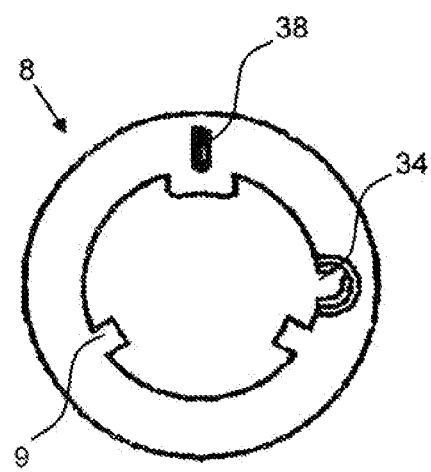
Figure 11:
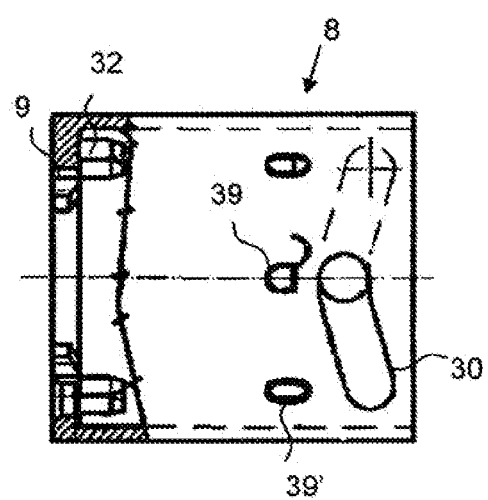
Figure 12:
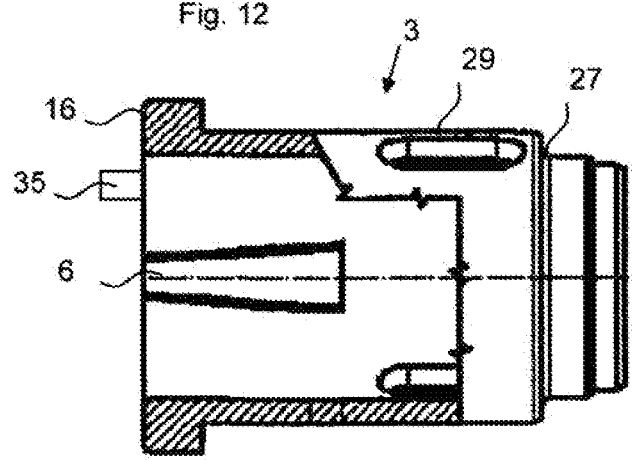

Here are shown:

FIG. 1 a perspective view of the components of a steering arrangement according to one embodiment according to the invention, FIG. 2 a perspective sectional view through the steering arrangement in the plugging position in an unrotated state, FIG. 3 a perspective sectional view through the steering arrangement in the plugging position when the sleeve is rotated, FIG. 4 a perspective sectional view through the steering arrangement in the plugging position in a clamped state, FIG. 5 a perspective view of the plug partners of the steering spindle arrangement before assembly, FIG. 6 a perspective sectional view of the plug partners of the steering spindle arrangement in the plugging position in an unrotated state, FIG. 7 a perspective sectional view of the plug partners of the steering spindle arrangement in the plugging position after rotation of the sleeve in the clamped state, FIG. 8 a perspective view of the components of a steering arrangement according to a further embodiment according to the invention, FIG. 9 a side top view onto a steering spindle connection of the steering arrangement from FIG. 8, FIG. 10 a top view onto the front side of the sleeve of the steering arrangement from FIG. 8, FIG. 11 a sectional side view of the sleeve of the steering arrangement from FIG. 8, FIG. 12 a sectional side view of the intermediate piece of the steering arrangement from FIG. 8,

DETAILED DESCRIPTION

The invention relates to a steering arrangement having an intermediate piece connecting the steering coupling to the end of the steering spindle. The intermediate piece is, on the one side, hinged on the coupling by means of a fork, while on the other side the intermediate piece is connected to the spindle end. The intermediate piece can, at this interface at which it is connected to the steering spindle end, be swivelled out in the released, i.e. unconnected, state, in order to simplify the assembly of the engine module, which would otherwise be hindered by the steering train due to very little installation space. The steering spindle can be pushed back to some extent in the direction of the steering wheel for assembling the engine module on the body. After the assembly of the engine, the intermediate piece is reconnected to the end of the steering spindle. Since the construction space hardly leaves any space for a manual operation and the connecting partners are difficult to detect optically, in order to simplify this process for the assembler and thus to minimize the risk of defective assemblies, the ends of the coupling and the steering spindle that face each other, that is to say the intermediate piece and the steering spindle connection, are designed according to the invention as plug partners, which have guide elements that interact together with formation of a torque-transmitting priority control. A clamping device is furthermore provided in order to clamp the plug partners together in the plugging position. FIGS. 1 to 12 illustrate the components of the steering arrangement and the interaction thereof.

The steering spindle end ends in a cylindrical pin—the steering spindle connection 2—which is peripherally chamfered on the front side, and here virtually has an insertion ramp 28 for simplifying insertion into the receiver connected to the joint yoke 4, the main components of which are the intermediate piece 3, the sleeve 8 and the clamping device. The clamping device is set out in greater detail below. The guide elements 5 of the steering spindle connection 2 are connected to the ramp-like recess 28, wherein these are presently keyways 5, such as can be seen in FIGS. 1 and 5 as well as 8 and 9, which are spaced apart in the peripheral direction by wedge segments. Three grooves 5 are preferably distributed equally over the periphery, wherein the wedged shape of the grooves 5 tapers towards the steering wheel side.

The keyways 5 pass towards the steering wheel side into an annular groove 10 (FIGS. 1 and 5) or into a recess 10 that has been set back (FIGS. 8 and 9), which can lie deeper than the keyways 5.

The intermediate piece 3, also known as a splined hub 3, contained by the receiver has tongues 6 on its interior, which are formed as wedge segments with a negative shape with respect to the keyways 5 of the steering spindle connection 2 and which can be seen in FIGS. 5, 8, 12. The intermediate piece 3 possesses, on its end facing the steering spindle, an annular collar 16 projecting radially outwards, and tapers in a stepped recess 27 in the region of the other end, wherein the recess 27 is approximately the same shape as the ramp 28 of the steering spindle connection 2.

A slot 29 in the splined hub 3 is formed in the region of the recess 27, through which a locking pin 41 (cf. FIGS. 2, 3) passes under exertion of a locking function. With this lock-and-key principle, the rotation of the sleeve 8 can only take place with the correct type of steering spindle. The locking pin 41 furthermore serves as transportation security, so that a rotation of the sleeve 8 by vibrations or undesired actuation is prevented.

The end of the splined hub 3 facing away from the steering spindle is connected to a corrugated pipe, which for its part bears the joint yoke 4 for the coupling to the gearbox. The connection is, on the one hand, non-positive (frictional), since the end of the intermediate piece 3 is pressed into the corrugated pipe. On the other hand, after the impressing, the end is welded with the corrugated pipe under formation of a circumferential weld.

As can be seen in FIG. 1, the intermediate piece 3 furthermore has a longitudinal groove 24 on its exterior, which breaks through the recess 27 in the same way as the slot 29.

Moreover, the intermediate piece 3 can have a control pin 42, which extends from the peripheral surface of the annular collar 16 and thus can be arranged in a bore-hole, for example. The control pin 42 is depicted in FIG. 4.

In one embodiment, which is depicted in FIGS. 1 to 7, a sleeve-like spring compressor 20 is moveably arranged on the intermediate piece 3 between the recess 27 and the annular collar 16. The clamping sleeve 20 has, in a peripheral region, a spring tongue 22 having an opening 40, which is penetrated by the locking pin 41. During the puncturing, the pin 41 is tightly connected to the tongue 22. The clamping sleeve 20 firmly bears an inner guiding pin 23, which is immersed into the longitudinal groove 24 of the intermediate piece 3. A further guiding pin 21 extends radially outwards from the sleeve 20. If necessary, both guiding pins 21, 23 can be embodied by a single pin that penetrates the sleeve 20. In the present case, the clamping sleeve 20 has two tongues 22, as well as two penetrative guiding pins 21, 23. For two inward-facing guiding pin sections 23, the intermediate piece has two correspondingly arranged longitudinal grooves 24.

The intermediate piece 3 surrounds a tension spring 7, which is supported on one side on the side of the annular collar 16 of the intermediate piece 3 facing the clamping sleeve 20 and is supported on the other side on the guiding pin 21 (FIGS. 2 to 4).

The intermediate piece 3, the clamping sleeve 20 and the tension spring 7 are extensively enclosed by a sleeve 8. The sleeve 8 has two slots 30, 31 forming guide runners. One of the two slots 31 is formed in the end region of the sleeve 8 that is close to the steering wheel, wherein the control pin 42 of the intermediate piece 3 engages with the slot 31. The slot 31 runs in such a way that self-locking is provided for the sleeve 8, preferably solely in the peripheral direction along a specific course 31a. On one end of this course 31a, the peripheral section 31a of the slot 31 passes into an axial channel 31b turning at right angles from the peripheral section 31a and running towards the closing edge of the sleeve 8.

The other slot 30 is arranged in the vicinity of the other end of the sleeve 8 and is designed helically in the form of the path of a bayonet twist lock. The guiding pin 21 of the clamping sleeve 20 protrudes into this slot 30. If a clamping sleeve 20 is provided with two outward-facing guiding pin sections 21, two slots 30 are introduced into the sleeve 8 accordingly. The helical shape is not necessary, but still advantageous, for preventing a hard release impact when the control pin 42 is inserted into the channel 31b. A parallel route of the slot 30 with respect to the course 31a is, however, to be avoided, since, in this case, the elastic force does not have an effect and the keyways 6 cannot be clamped with the tapered tongues 5. Due to the fact that the helical shape possesses a gradient that is non-inhibiting, the rotation of the sleeve 8 shown below is simplified.

The sleeve 8 possesses gearing segments 9 (see FIGS. 3, 5, 6, 7, 8, 10) on its end facing the steering wheel, said segments pointing radially inwards and being located in the peripheral direction with approximately the same spacing.

The assembly process is described below with the aid of FIGS. 2 to 4 and 5 to 7, which show a steering spindle arrangement according to one embodiment. An assembly process will of course take place analogously to further embodiments according to the invention, for example those that are shown in FIGS. 8 to 12.

During assembly, the steering spindle connection 2 is combined with the receiver on the coupling side, wherein the steering spindle connection 2 is immersed into the sleeve 8 and the intermediate piece 3 (FIG. 5). In this combination process, the ramp-like recess 28 of the steering spindle connection 2 raises the locking pin 41 mounted elastically on the spring tongue 22 and unlocks the receiver for the further coupling. The keyways 5 of the steering spindle connection 2 have first been provided with the corresponding wedge segments 6 of the intermediate piece 3 by rotation. The gearing segments 9 of the sleeve 8 run within the keyways 5 of the steering spindle connection 2. The displacement of the steering spindle ends with the stopping of the ramp-like recess 28 on the recess 27 of the intermediate piece 3. In this position, the gearing segments 9 of the sleeve 8 are located in the annular groove 10 of the steering spindle connection 2, opposite the outlet of the keyways 5 thereof (FIG. 2).

The sleeve 8 is then manually rotated, wherein the runner paths 30, 31 are guided on the control pin 42 and the guiding pin 21. In the unrotated state of the sleeve 8 (FIGS. 2, 6), the entire clamping force of the tension spring 7 is borne down on the control pin 42. When the sleeve 8 is rotated (FIG. 3), the tension spring 7 is released successively due to the helical shape of the runner path 30 allocated to the guiding pin 21, whereby the sleeve 8 and the clamping sleeve 20 are displaced towards the end of the intermediate piece 3 that does not have the annular collar. This displacement of the clamping sleeve 20 only runs axially, since the inner section 23 of the guiding pin 21 (cf. FIG. 4) is guided in the longitudinal groove 24 of the intermediate piece 3. The stressing of the control pin 42 is therefore continuously reduced during the rotation due to the reducing clamping force of the tension spring 7. When the channel 31b is reached, there is no stress on the control pin 42.

Due to the self-locking of the runner path 31 of the control pin 42, the coupling remains controlled at all times. During the rotation of the sleeve 8, the gearing segments 9 engage behind the stop 10' formed by the annular groove 10 or the wedge segments of the steering spindle connection (see FIG. 3). The length of the course 31a of the runner path 31 of the control pin 42 may only be of such length that, once rotation has ended, the gearing segments 9 are in any case located behind a stop 10' or the wedge segments.

If, as is depicted in FIG. 4, the control pin 42 now enters the channel 31b of the runner 31, the control pin 42 is unloaded, such that the tension spring 7 is further relaxed and thus the sleeve 8 that is not supported by the control pin 42 at this point in time is moved against the stop 10' of the annular groove 10. The control pin 42 is thus virtually locked in place in the channel 31b, wherein the coupling-side receiver is now clamped with the steering spindle connection 2 (FIG. 7).

Due to the relative axial movement of the steering spindle connection 2 with respect to the receiver, the keyways 5 of the steering spindle connection 2 are pressed in with the wedge segments 6 of the intermediate piece 3 by forming a wedged clamping. The connection can thus no longer be self-released.

The keyways 5 can furthermore have a dual-wedge shape over their entire length, i.e. the groove 5 does not only taper in the longitudinal axial direction towards the annular groove/recess 10, but also the edges of the groove 5 pull apart outwards at an angle in the radial direction. Due to the dual-wedge shape, during a clamping of the plug partners, a particularly firm gripping of the plug connection is created as a result of the wedged clamping achieved.

During disassembly, the individual movements run backwards, wherein, at the start, the clamping force of the tension spring 7 must be manually negotiated so as to retrieve the control pin 42 from the channel 31b.

The arrangement of the coupling does not necessarily have to be provided before the universal joint 4. An arrangement behind the joint 4 is also conceivable.

Alternatively, the control pin 42 and the runner 31 thereof may also be dispensed with. Instead, the sleeve 8 has a cam 32 on its interior behind the respective gearing segment 9, as can be seen in FIGS. 8 and 11, which is located with radial, rearward displacement with respect to the gearing segment 9. In the case of a plugged-together coupling and rotation of the sleeve 8 on the steering-spindle-side front side of the intermediate piece 3, the cam 32 moves along until it locks into an aperture or a depression 33 of the annular collar 16 of the intermediate piece 3, driven by spring compression. The arrangement of the aperture 33 is selected in such a way that the locking-in of the cam 32 takes place when the gearing segment 9 engages behind the stop 10' of the steering spindle connection 2.

Instead of the locking pin 41 used in the above embodiment, a trough-like impression 36 is formed on the front side of the intermediate piece 3 for each cam 32 as transportation security or security from rotation. In the transportation state, the cam 32 is locked into this, wherein the depths and the edges of the impression 36 are such that, when the sleeve is rotated 8 with a relatively low amount of force, the cam 32 can be released.

In addition to at least one of the gearing segments 9, the sleeve 8 has a depression 34 (see FIGS. 8 and 10). The depression 34 has the contour of a retainer ring. Alternatively, it is also conceivable for a retainer ring to be admitted into the depression 34. A pin 35 corresponds to the contour or the retainer ring, said pin protruding axially towards the sleeve 8 from the front side of the intermediate piece 3 and then snapping into the retainer ring when the cam 32 is locked into the apertures 33. Thus, a secure connection of the sleeve 8 with the intermediate piece 3 is achieved, and thus with the steering spindle, is then also provided when the tension spring 7 breaks and the clamping of the gearing segments 9 of the sleeve 8 on the stop 10' of the steering spindle connection 2 has been annulled.

Furthermore, as is depicted in FIGS. 8 and 10, a marking 38 in the form of an embossing or colored label can be provided on the front side of the sleeve 8, for example above a specific gearing segment 9, the marking showing the correct relative rotational position of the receiver with respect to the steering spindle connection 2 to the assembler, such that he may correctly combine the steering spindle and the receiver without effort.

Furthermore, markings 39, 39' can be applied to the ends of the runner path 30 allocated to the guiding pin 21 (FIGS. 8 and 11), which also visually show the assembler whether the receiver is (still) open (marking 39) or is already closed (marking 39'). In other words, the markings 39, 39' show the state of the connection between the steering spindle and the receiver.

Due to the optically-detectable indicators, markings and/or symbols, which are distributed on the periphery, not only can the correct relative rotational position of the plug partners be displayed to the assembler, but also the conclusion of the assembly process. Defective installations are thus prevented.

Furthermore, the clamping sleeve 20 shown in FIGS. 1 to 7 can be replaced by a ring or a ring segment 25 with holes 27 at two diametrically opposite positions, through which one of the bolts 21 that form the guiding pin can be pressed after sliding onto the intermediate piece 3 and the assembly of the receiver, wherein the ends of the bolt come to lie within the respective runner path 30. This variation represents a simplification of the clamping sleeve 20 in terms of formation and assembly. Compared to a ring, the ring segment 25 provides the advantage that it can also be applied laterally to the intermediate piece 3.

According to the invention, the connecting mechanism can advantageously only be released by plugging both partners. The connection takes place via spring-loaded wedge segments, which can compensate for clearance caused by wear. The opening of the connection is only possible using known engagement means, wherein a catch must be negotiated in order to unlock it.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A steering arrangement, comprising:
   a steering spindle having a steering spindle connection;
   a fork crown of a steering coupling connected to the steering spindle via an intermediate piece, wherein the steering spindle connection and the intermediate piece are formed as plug partners on ends facing each other by means of at least one tongue and groove guide element pair that provides a torque-transmitting priority control, and wherein a groove and a tongue of the at least one tongue and groove guide element pair are positioned in a longitudinal axial direction on the steering spindle connection and the intermediate piece, and
   a clamping device configured to clamp the plug partners together in a plugging position.

2. The steering arrangement according to claim 1, wherein the groove and tongue of the at least one tongue and groove guide element pair have a tapered shape, wherein the groove tapers in the longitudinal axial direction towards a side facing away from the plug partner, and the tongue tapers in the longitudinal axial direction towards a side facing the plug partner.

3. The steering arrangement according to claim 1, wherein
   three grooves, which are arranged with 120° displacement to one another, are provided on a cylindrical exterior of an end of the steering spindle connection facing the intermediate piece,
   at least one or more tongues are provided on a cylindrical interior of the intermediate piece, and
   a groove is present on the steering spindle connection for each tongue of the intermediate piece.

4. The steering arrangement according to claim 3, wherein
   the grooves on the steering spindle connection, at their end facing away from the intermediate piece, pass into a recess or an annular groove, the radial depth of which corresponds to, or is greater than, a groove depth, and
   the intermediate piece bears a sleeve moveable relative to the intermediate piece, which has one or more gearing segments extending radially inwards from an edge of the sleeve on a steering-spindle-side end of the sleeve, the one or more gearing segments engaging with the recess/annular groove in the plugging position, which forms a stop with its coupling-side edge.

5. The steering arrangement according to claim 1, wherein the clamping device comprises:
   a downwardly extending annular collar extending radially outwards on a steering-spindle-side end of the intermediate piece,
   a helical spring arranged around the intermediate piece and supported at a first end on the downwardly extending annular collar, and
   a guide device having at least one guiding pin, which is axial moveable on the intermediate piece, wherein the helical spring is supported at a second end, which is opposite of the first end, on the guiding pin.

6. The steering arrangement according to claim 5, wherein
   the guide device is a clamping sleeve, from which the guiding pin extends radially outwards, wherein the clamping sleeve furthermore has, in a peripheral region, a spring tongue penetrated by a locking pin, and a second guiding pin, which extends radially inwards, and which engages with a longitudinal groove that is introduced in the longitudinal axial direction in an exterior of the intermediate piece, or
   the guide device is a ring or ring segment having holes at two diametrically opposite positions, which receive a bolt forming the guiding pin.

7. The steering arrangement according to claim 6, wherein
   the intermediate piece tapers in a stepped recess on a coupling-side end facing away from the annular collar, the recess corresponding approximately to a ramp shape of the coupling-side end of the steering spindle arrangement, wherein a slot is formed in a region of the intermediate piece that is close to the recess in a section between the recess and the annular collar, through which slot the locking pin extends, and the longitudinal groove is arranged in a region of the intermediate piece that is close to the recess in the section between the recess and the annular collar to break through the recess.

8. The steering arrangement according to claim 6, wherein the sleeve, which encloses the intermediate piece, the guide device, and the helical spring, has at least one first slot forming a guide runner for the guiding pin of the guide device, and which runs helically.

9. The steering arrangement according to claim 5, wherein
the intermediate piece comprises a control pin extending from a peripheral surface of the annular collar, wherein the control pin is arranged in a bore-hole in the peripheral surface, and the control pin engages with a second slot in the sleeve, which is formed in the steering-spindle-side end region of the sleeve as a guide runner, and which has a first course section in the peripheral direction and a second course section running at right angles to the first course section in the axial direction towards the steering-spindle-side end of the sleeve.

10. The steering arrangement according to claim 5, wherein
the sleeve has a cam on an interior of the sleeve behind each gearing segment, which is displaced radially rearwards with respect to the gearing segment and which engages with a depression of the annular collar in the plugging position, the gearing segment engages behind the coupling-side edge of the recess/annular groove, and a trough-like impression is formed for each cam on a front side of the intermediate piece as transportation security, with which the cams engage in a transportation arrangement.

* * * * *